Patented Oct. 1, 1929

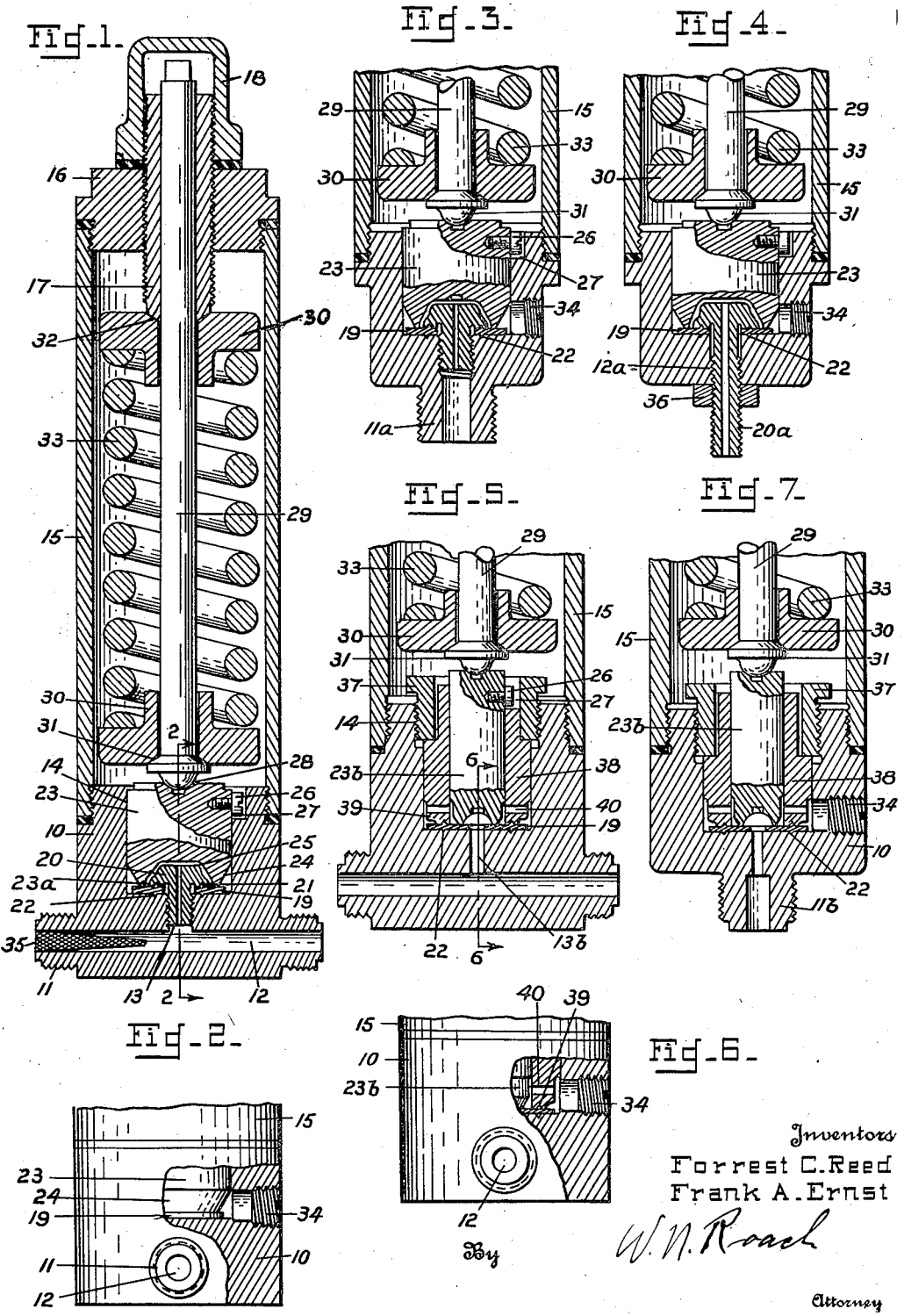

1,730,294

UNITED STATES PATENT OFFICE

FORREST C. REED, OF SAN FRANCISCO, CALIFORNIA, AND FRANK A. ERNST, OF SOMERSET, MARYLAND

RELIEF VALVE

Application filed August 1, 1927. Serial No. 209,851.

The subject of this invention is a relief valve intended more particularly for use with fluids under high pressure.

In recent years certain processes require the use of gases having a low atomic weight such as hydrogen, compressed to high pressures such as 4000 pounds per square inch and higher. Commercial relief valves having conical seats when used in this connection can be ground in and made gas tight until they relieve, but after relieving such valves will not reseat but will continue to leak between the valve and seat.

We have proven by actual test and experiment that in order to prevent leakage between the valve and seat of a relief valve after the valve was relieved, there must be a definite unit pressure exerted by the valve on its seat. Therefore, with a given diameter and width of valve seat, the pressure at which relief occurs must be a definite amount in excess of the working pressure in the system. It is desirable to keep this excess in pressure as low as possible; in order to accomplish this a valve with a comparatively large diameter and narrow seat is required, i. e., the diameter of valve is large in proportion to the cross sectional area of pipe required to carry the same amount of gas without excessive loss of pressure by friction. An example to illustrate the foregoing remarks would be a relief valve to operate on a system carrying a pressure of 5000 pounds per square inch; it is desirable that the maximum pressure on the system should not exceed 5200 pounds per square inch, i. e., a pressure rise of 200 per square inch; and supposing experiments have shown that a unit pressure of 6000 pounds per square inch is required on the valve seat in order to prevent leakage after relief occurs; if the best practicable width of valve seat is considered to be .010 inches, then it follows that $$\frac{\text{area of valve} \times \text{pressure difference (200)}}{\text{area of valve seat}} = 6000$$

from whence the diameter of valve would be 1.2 inches. By the same method of calculation, if it were required to keep the pressure rise in the system down to 150 pounds per square inch, the diameter of valve would have to be increased to 1.60 inches. Now at a pressure of 5000 pounds per square inch, a valve having a diameter of ⅛ inch would, in general, suffice to pass enough gas to maintain a pressure of 5000 pounds, but to maintain the required unit pressure of 6000 pounds per square inch on the valve seat, by the same method of calculation, the pressure rise would have to be 1920 pounds instead of 200 pounds as is required with the above valve having a diameter of 1.2 inches, i. e., the valve would have to be set to relieve at 6220 pounds instead of 5200 pounds.

It is a well known fact to those skilled in the art, that the surfaces of two elements of a device can not be made true with respect to each other if the alignment of two or more such elements is dependent on screw threaded means, such as is common with the usual construction of commercial valves. It should, therefore, be particularly noted that in the following description and drawings a construction is provided which makes possible the true alinement of surfaces and which alinement is independent of threaded means.

This invention therefore has for its object to provide a spring balanced valve which will relieve at a predetermined pressure depending on the initial tension on said spring; to provide means for reseating of the valve after relieving; to provide means for quickly renewing the valve seat; to provide means for obtaining a high unit pressure between the valve and valve seat; to provide a valve seat the alignment of which is independent of threaded means; and to obtain simplicity of construction and operation.

A practical embodiment of the invention is illustrated in the accompanying drawings, wherein:

Fig. 1 is a longitudinal section through a preferred form of relief valve;

Fig. 2 is a fragmentary side elevation of relief valve and partly in vertical section on the line 2—2 of Fig. 1;

Fig. 3 is a fragmentary vertical section similar to the lower part of Fig. 1 showing a modified construction of relief valve;

Fig. 4 is a similar section showing a further modified construction of relief valve;

Fig. 5 is a similar section showing another modified construction;

Fig. 6 is a fragmentary side elevation of a relief valve and partly in section on line 6—6 of Fig. 5;

Fig. 7 is a fragmentary section showing a still further modified construction of relief valve.

Referring to the drawings by numerals of reference:

In the specific embodiment of this invention as shown more especially in Figs. 1, 2 and 3, there is provided a relief valve body 10 formed with diametrically opposite threaded nipples 11 through which the device may be attached to a pressure pipe line. Concentric with the nipples and passing diametrically through the body is a passage or bore 12 communicating with an axial bore 13 which is tapped for a purpose soon to be described, and which communicates with a cylindrical recess 14 formed in the body. The recessed end of the body is reduced and threaded to receive a casing 15, the other end of which is closed by threaded plug 16 centrally tapped to receive an adjusting sleeve or screw 17 on the extending outer end of which may be threaded a cap 18.

In the floor of the recess 14 is a gasket 19 forming a valve seat and held in place by an apertured screw plug 20. The opposed faces of the screw plug and the recessed floor are provided with alining annular grooves 21—22 respectively so that when the screw plug is threaded home the material of the gasket, which is softer than the valve material, is forced into such grooves and provides an effectual fluid tight joint.

Within the recess is mounted for reciprocation a cylindrical valve 23, one end of which has a conical taper 24 and a recess 25 to establish a narrow annular face $23^a$. The recess is so proportioned that when the valve is seated there is provided a space between the head of the retaining plug and the wall of the recess. The valve is provided with means to prevent rotary displacement thereof which means may consist of a screw 26 threaded into the valve and having its head projecting radially into a slot 27 cut in the side wall of the recess 14.

In the outer face of the valve is a hemispherical depression 28 establishing a seat for the balled end of the stem or rod 29 which is resiliently held in contact with the valve. The rod or stem extends through the sleeve 17 with a close sliding fit and has mounted thereon between such sleeve and the balled head or end a pair of pressure plates 30 which have a loose fit on the stem and are formed with frustro-conical depressions to seat respectively on the correspondingly shaped surface 31 on the stem and a similar surface 32 on the inner end of the sleeve. Between these plates is a coiled spring 33 the tension of which may be adjusted by manipulation of the screw sleeve 17.

In the valve body is provided an escape port 34 communicating with the annular space about the tapered end of the valve so that when the valve is lifted pressure fluid may flow through such escape orifice. A strainer 35 may be provided in the bore 12, if desired.

In the modification shown in Fig. 3 the construction is similar to that just described except that an axial nipple $11^a$ extends from the bottom of the body and affords a means of attaching the valve to a pressure line.

In the further modification of Fig. 4 the valve is likewise of similar character except that the body 10 is apertured at $12^a$ to receive the elongated threaded stem of the plug $20^a$ which is clamped in place by a nut 36. The extended threaded stem serves as an attaching means to a pressure line.

In the modification shown in Figs. 5 and 6 the general construction is the same except that the valve seat is within the fluid-tight joint instead of being without the same. For this purpose the recess 14 is counter bored and tapped to receive a gland 37 which engages an annular shoulder formed by reducing an end of a sleeve 38 which has a close sliding fit in the recess 14 and the other end of which is reduced and provided with an annular groove 39, this end serving to clamp the gasket 19 as herein before described. Radial ports 40 are provided in the sleeve to permit passage of fluid. Within this sleeve is a cylindrical valve $23^b$ similar to though of smaller diameter than the valve 23 of Figs. 1, 3 and 4. The duct or bore $13^b$ is, of course, in this instance not tapped.

The arrangement of the valve shown in Fig. 7 is identical with that of Fig. 5 the only change being in the provision for attachment which like Fig. 3 consists of a nipple $11^b$.

We claim:

1. A relief valve including a body having a fluid passage, an escape port and a cylindrical recess, a valve seat of ductile material on the floor of said recess, an axially bored plug secured to the body in position to have fluid communication with the passage and retaining the valve seat, the opposed faces of the plug and the floor of the recess having alined annular grooves, a cylindrical valve reciprocally mounted in the recess in the body and formed with a tapered axially recessed end presenting a narrow annular valve face, said valve when closed being spaced from the retaining plug, and closing means pivotally engaging the valve.

2. A relief valve for high pressure systems including a body having a fluid passage, an escape port and a cylindrical recess, a valve seat of ductile material on the floor of said recess, an axially bored plug secured to the body in position to have fluid communication with the passage and retaining the valve seat, a cylindrical valve reciprocally mounted in the recess in the body and formed with a tapered axially recessed end overlying the plug and presenting a narrow annular valve face, said valve when closed being spaced from the retaining plug, and closing means pivotally engaging the valve.

3. A relief valve for high pressure systems including a body having a recess and inlet and escape passages communicating therewith, a valve seat of ductile metal on the floor of said recess, compressing means on the high pressure side of the valve seat for retaining the valve seat in position, a valve reciprocally mounted in the recess in the body and having a narrow annular valve face, and closing means pivotally engaging the valve.

4. A relief valve for high pressure systems including a body having inlet and escape passages, a valve seat adjacent the inlet passage, means for securing the seat in place on the high pressure side of the valve seat, a valve cooperating with the seat, formed with an annular face, the width of the face being small relative to the diameter of the valve, and self adjusting means for seating the valve evenly.

5. A high pressure relief valve embodying a valve having a narrow annular face, the diameter of the valve with respect to a uniform width of the face of the valve being determined by the operating pressure difference.

6. A high pressure relief valve embodying a valve whose diameter is determined according to the formula $$\frac{\text{Pressure difference} \times \text{area of valve}}{\text{area of seat}} = \text{Predetermined unit pressure of reseating.}$$

FORREST C. REED.
FRANK A. ERNST.